US011238326B2

(12) United States Patent
Gupta

(10) Patent No.: US 11,238,326 B2
(45) Date of Patent: *Feb. 1, 2022

(54) INFORMATION CARD OBJECT COUNTER

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/223,209

(22) Filed: Apr. 6, 2021

(65) Prior Publication Data

US 2021/0397918 A1    Dec. 23, 2021

Related U.S. Application Data

(63) Continuation of application No. 16/906,022, filed on Jun. 19, 2020, now Pat. No. 10,997,485.

(51) Int. Cl.
| | | |
|---|---|---|
| *G06K 19/07* | (2006.01) | |
| *G06K 19/077* | (2006.01) | |
| *G07D 11/50* | (2019.01) | |
| *G07D 7/128* | (2016.01) | |
| *G07D 7/121* | (2016.01) | |
| *G06K 9/00* | (2006.01) | |

(52) U.S. Cl.
CPC ... *G06K 19/07707* (2013.01); *G06K 9/00469* (2013.01); *G07D 7/121* (2013.01); *G07D 7/128* (2013.01); *G07D 11/50* (2019.01)

(58) Field of Classification Search
CPC ......... G06K 19/07707; G06K 9/00469; G07D 11/50; G07D 7/121; G07D 7/128
USPC ...................................................... 235/492
See application file for complete search history.

(56) References Cited

U.S. PATENT DOCUMENTS

| | | | |
|---|---|---|---|
| 2,827,167 A | 3/1958 | Joseph et al. | |
| 5,058,875 A | 10/1991 | Stewart | |
| 10,997,485 B1* | 5/2021 | Gupta | ................ G07D 7/202 |
| 2018/0095952 A1 | 4/2018 | Rehal | |
| 2019/0286805 A1 | 9/2019 | Law et al. | |
| 2020/0213461 A1 | 7/2020 | Matsuoka et al. | |

* cited by examiner

*Primary Examiner* — Daniel A Hess
(74) *Attorney, Agent, or Firm* — Weiss & Arons LLP

(57) ABSTRACT

The apparatus may include a microprocessor. In electronic communication with the microprocessor there may be a memory cell. In electronic communication with the microprocessor there may be a light source circuit. In electronic communication with the microprocessor there may be a camera circuit. In electronic communication with the microprocessor there may be a nano light-emitting diode display circuit. Stored in the memory cell there may be image-processing instructions. Stored in the memory cell there may be light-source control instructions. The memory cell; the light source circuit; the camera circuit; and the nano light-emitting diode display circuit may be embedded in an information card. The instructions may be configured to cause the microprocessor to count objects set in motion by a user. The motion may be a motion of manually flicked objects.

21 Claims, 8 Drawing Sheets

INFORMATION CARD OBJECT COUNTER

CROSS REFERENCE TO RELATED APPLICATION

This application is a continuation of Ser. No. 16/906,022, filed on Jun. 19, 2020, and entitled INFORMATION CARD OBJECT COUNTER, which is hereby incorporated by reference herein in its entirety.

BACKGROUND

Counting objects is a routine task that can be improved using counting devices. Existing counting machines are large, heavy and expensive. They are not conducive to being carried by individuals on a regular basis.

Therefore, it would be desirable to provide apparatus and methods for counting objects.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
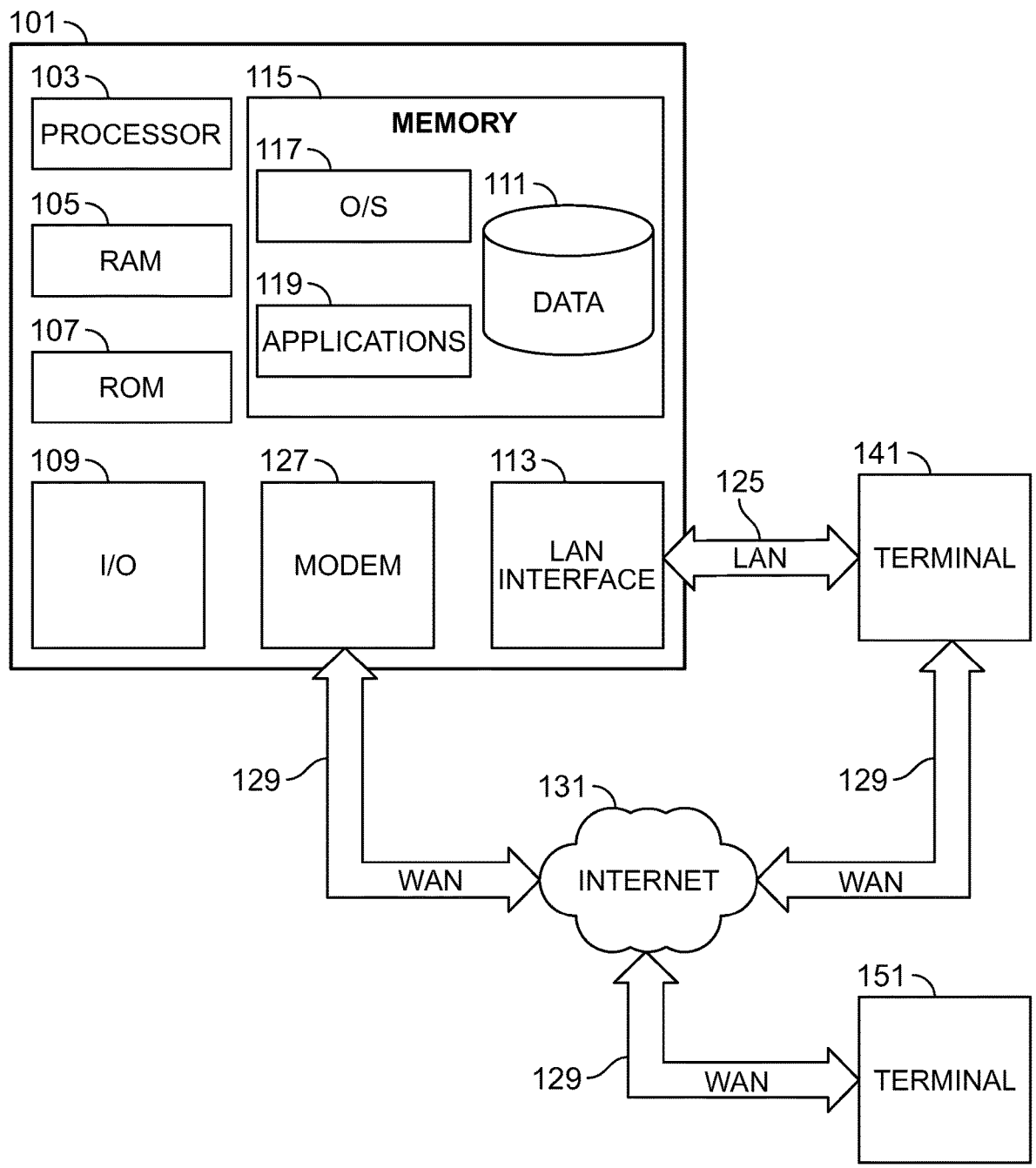
FIG. 1 shows illustrative apparatus that may be used in accordance with principles of the invention.

Apparatus, methods and instructions for counting objects are provided. The methods and instructions may involve the apparatus.

The apparatus may include a microprocessor. In electronic communication with the microprocessor there may be a memory cell. In electronic communication with the microprocessor there may be a light source circuit. In electronic communication with the microprocessor there may be a camera circuit. In electronic communication with the microprocessor there may be a nano light-emitting diode display circuit.

Stored in the memory cell there may be image-processing instructions. Stored in the memory cell there may be light-source control instructions.

The memory cell; the light source circuit; the camera circuit; and the nano light-emitting diode display circuit may be embedded in an information card. The instructions may be configured to cause the microprocessor to count objects set in motion by a user. The motion may be a motion of manually flicked objects.

For the purposes of this application, "flicking" and "flicked" relate to the serial release of part of an object from a state of stress, for example, release of the end of a card that is bound at an opposite end, when there is a bending stress in the card between the ends.

Table 1 lists illustrative objects that may be counted.

TABLE 1

| Illustrative objects |
| --- |
| Illustrative objects |
| Note of hand |
| Promissory note |
| Bank bill |
| Federal Reserve note |
| Government note |
| Currency note |
| Brokerage account |
| Bill |
| Check |
| Illustrative objects |
| Folio |
| Leaf |
| Page |
| Tender |
| Sheet |
| Card |
| Not card |
| Playing card |
| Other suitable objects |

Table 2 lists illustrative motions.

TABLE 1

| Illustrative motions |
| --- |
| Illustrative motions |
| Falling |
| Cascading |
| Hovering (as in an air current) |
| Flicking |
| Other suitable objects |

The image processing instructions may be configured to cause the microprocessor to detect lineations corresponding to objects in a bundle. The bundle may include one or more objects. The image processing instructions may be configured to detect the lineations using ambient light. The microprocessor may be configured to cause the light source circuit to emit a beam of light toward the bundle. The image processing instructions may be configured to store a frame grab from the camera in the memory.

The nano light-emitting diode display circuit may include a display. The microprocessor may be configured to display a frame grab from the camera on the display.

The image processing instructions may be configured to identify a light intensity peak in light reflected from an edge of a manually flicked object. The image processing instructions may be configured to identify a low light region contiguous with the light intensity peak. The light intensity peak may one of a sequence of light intensity peaks, each peak corresponding to an object edge in the bundle. The peak may be of several peaks. The microprocessor may be configured to determine a number of the peaks.

The image processing instructions may be configured to identify a leading low-light region. The image processing instructions may be configured to identify a trailing low-light region. The leading low-light region may identify a first object edge. The trailing low-light region may identify a last object edge. The number may a number of peaks between the leading low-light region and the trailing low-light region.

The image processing instructions may be configured to formulate for the peak a lineament that tracks motion of the corresponding object edge from a first frame grab to a second frame grab. The lineament may one of a sequence of lineaments, each lineament corresponding to a different object in the bundle. The microprocessor may be configured to determine a number of lineaments crossing a reference point in a field of view of the camera.

The image processing instructions may be configured to render a time series of reflected light intensity at the reference point. The image processing instructions may be configured to render the time series based on the lineaments corresponding to the objects. The image processing instructions may be configured to detect an anomaly in the time series. The anomaly may be an over-broad peak. The anomaly may be an over-broad valley or low-light region between consecutive peaks.

The nano light-emitting diode display circuit may include a display. The microprocessor may be configured to display on the display an error code corresponding to the anomaly.

The image processing instructions may be configured to generate a compressed data sequence corresponding to the time series.

The information card may be configured to transmit the compressed data sequence to a remote analysis engine. The information card may be configured to receive a filter kernel from a remote analysis the image processing instructions may be configured to instruct the microprocessor to apply the kernel to the time series to detect the anomaly.

Table 3 lists illustrative anomalies.

TABLE 3

Illustrative anomalies

Illustrative anomalies

Object folded
Object not askew from neighboring objects
Object extends past neighboring objects
Object recessed relative to neighboring objects
Object thickness differs from average thickness by more than a predetermined threshold (e.g., 1%, 2%, 3%, 10%, 15%)
Object edge too misshapen to resolve
Bundle improperly positioned
Bundle improperly flicked
Bundle improperly flexed
Illustrative anomalies
Bundle includes insufficient number of objects
Bundle includes excessive number of objects
No edge detected
No bundle detected
Other suitable anomalies Illustrative embodiments of apparatus and methods in accordance with the principles of the invention will now be described with reference to the accompanying drawings, which forma part hereof. It is to be understood that other embodiments may be utilized and that structural, functional and procedural modifications or omissions may be made without departing from the scope and spirit of the present invention.

FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a light controller, pattern capture controller, display controller, AR controller, image controller, image processor, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
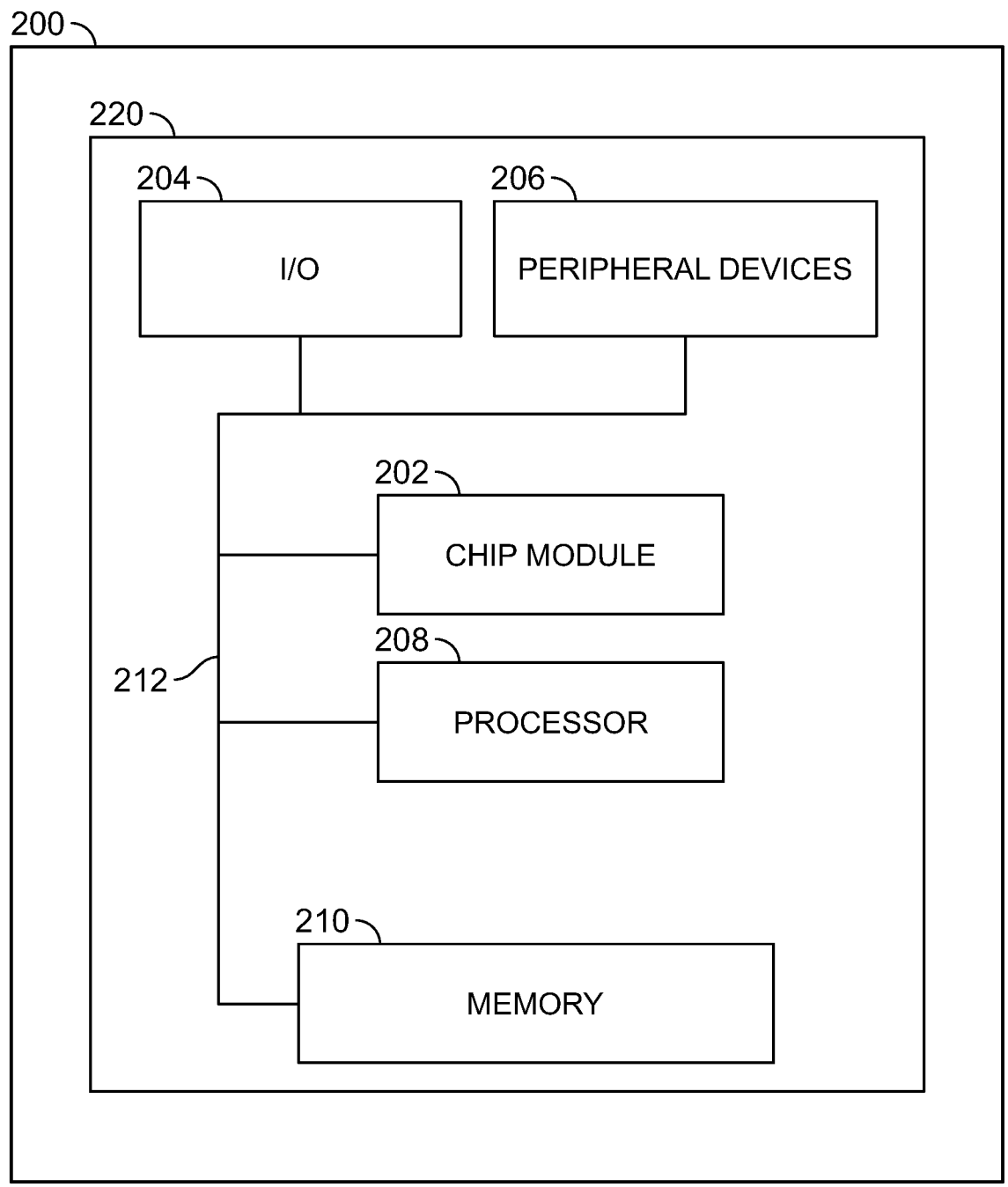
FIG. 2 shows illustrative apparatus that may be used in accordance with principles of the invention.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute pattern metrics, lineations, lineation motion, lineation counts and perform other methods described herein; and machine-readable memory 210.

Machine-readable memory 210 may be configured to store in machine-readable data structures: images, light patterns, light pattern metrics, natural feature overlays, object counts and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
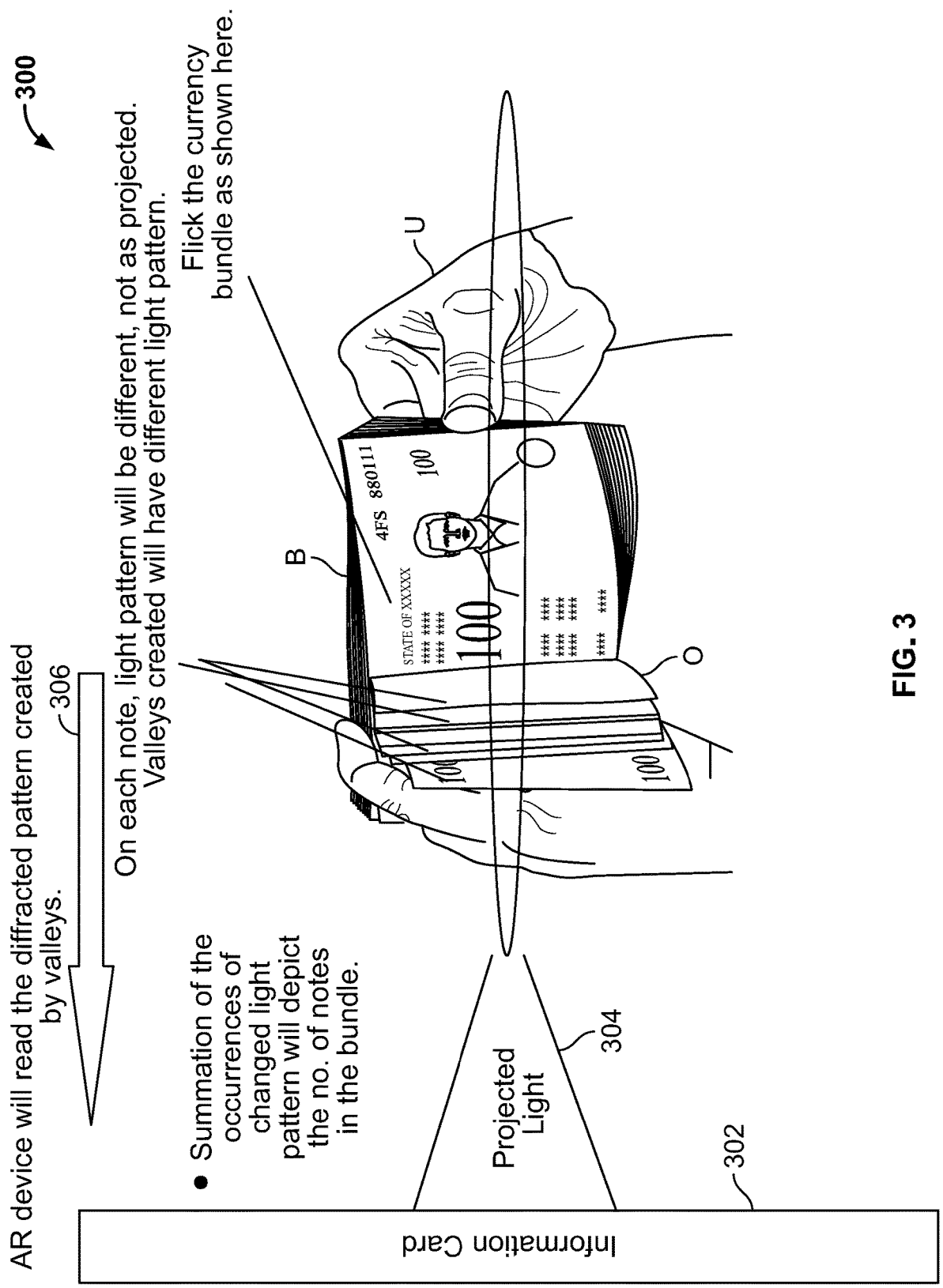
FIG. 3 shows illustrative architecture in accordance with principles of the invention.

FIG. 3 shows illustrative architecture 300 for counting objects. Architecture 300 may include information card 302. Architecture 300 may include bundle B of objects O. Card 302 may project light 304 at bundle B. User U may flick objects O in light 304. Objects O may reflect back to information card 302 reflected light 306. Reflected light 306 may include a pattern. The pattern may include a "diffraction pattern." The pattern may include peaks and valleys. A peak may correspond to a strong reflection from object O as it passes through light 304. A valley may correspond to a weak, sub-detection or non-existent reflection between object O and an adjacent object as the objects pass through light 304. Circuitry (not shown) may provide a sum of changes in the pattern. A change may be based on a sequence of peaks and valleys. The sum may correspond to a number objects in bundle B.

Figure 4:
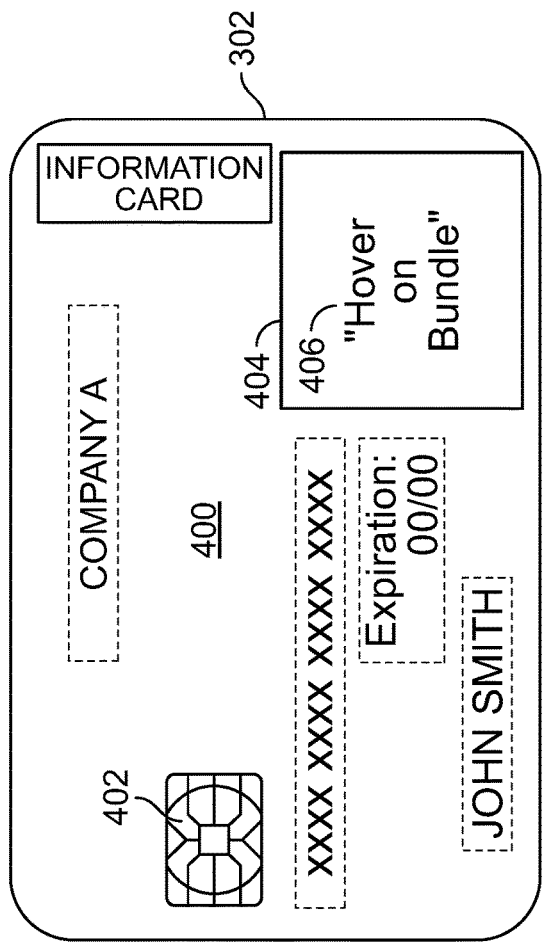
FIG. 4 shows illustrative apparatus in accordance with principles of the invention.

FIG. 4 shows illustrative front side 400 of information card 302. Information card 302 may include circuitry 402. Circuitry 402 may include a microprocessor. Circuitry 402 may include a memory cell. Circuitry 402 may include a light source circuit. Circuitry 402 may include a camera circuit. Circuitry 402 may include a nano light-emitting diode display circuit. Information card 302 may include display 404. Display 404 may be in electronic communication with circuitry 402.

The memory cell may store a user instruction. The memory cell may store an image-processing instruction. The memory cell may store a light-source control instruction. The user instruction may include instruction 406, "HOVER ON BUNDLE." Instruction 406 may instruct user U to hover card 302 above bundle B.

Information card 302 may include RF circuitry (not shown). The RF circuitry may communicate data gathered from bundle B to a remote platform. The RF circuitry may receive from the remote platform a validation of a classification of a feature in an image of bundle B. The RF circuitry may receive from the remote platform a classification of a feature in an image of bundle B. The feature may be an edge.

Figure 5:
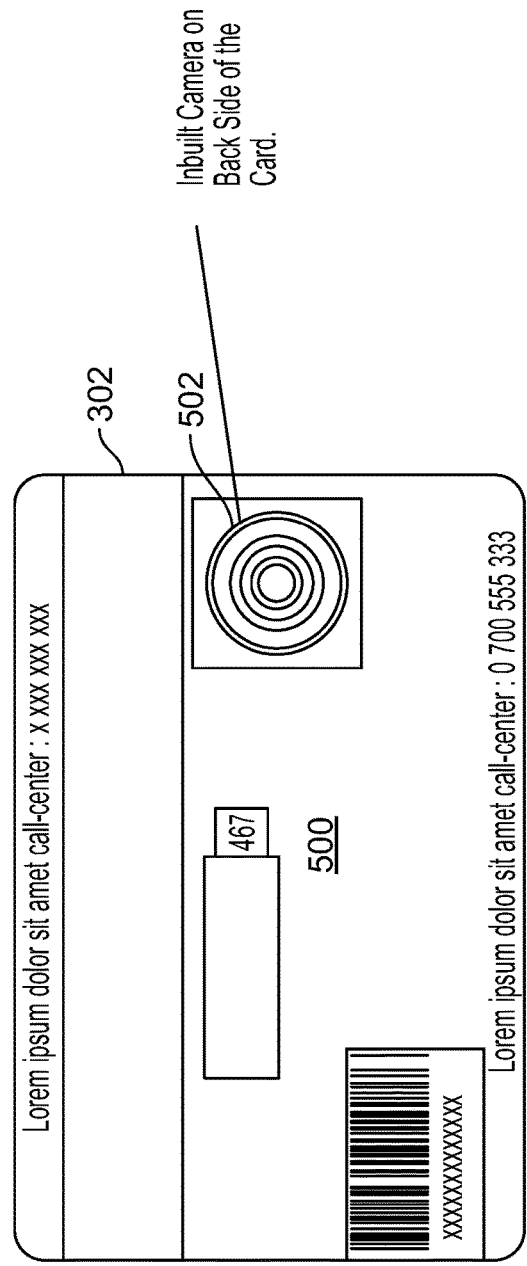
FIG. 5 shows illustrative apparatus in accordance with principles of the invention.

FIG. 5 shows illustrative reverse side 500 of card 302. Reverse side 500 may include camera 502. Camera 502 may be disposed back-to-back with display 404 (shown in FIG. 4). Camera 502 may be disposed in a position in which camera 502 if offset from display 404. Camera 502 may be disposed in a position in which camera 502 overlaps display 404. Camera 502 may be disposed in a position in which camera 502 does not overlap display 404.

Figure 6:
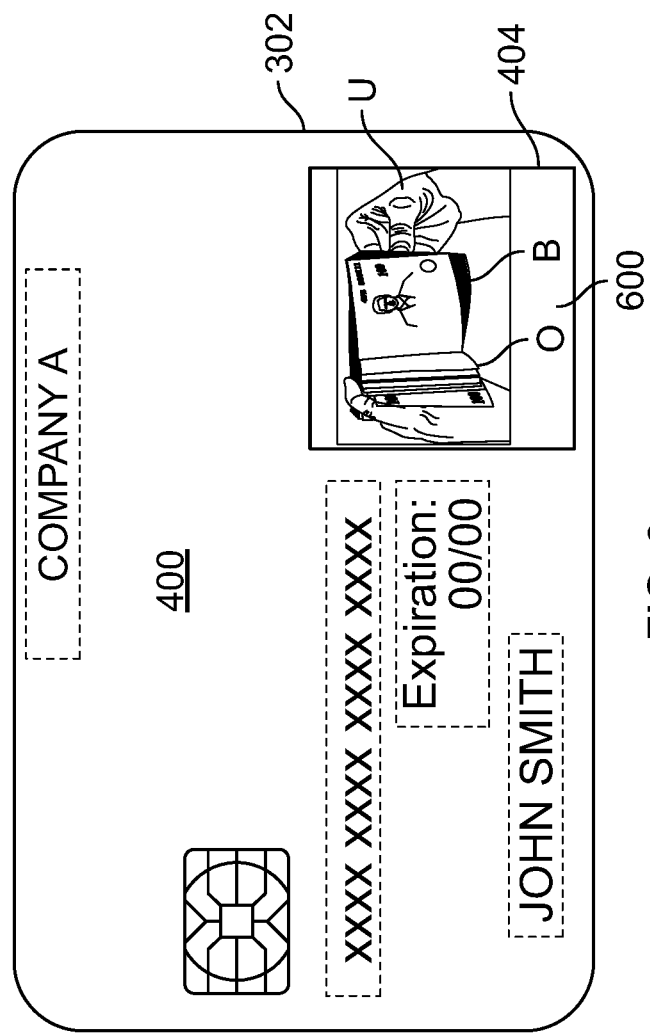
FIG. 6 shows illustrative apparatus in accordance with principles of the invention.

FIG. 6 shows illustrative front side 400 of information card 302. Display 404 may display image 600. Image 600 may be acquired by camera 502 (shown in FIG. 5). Image 600 may show user U. Image 600 may show bundle B. Image 600 may show object O.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Figure 7:
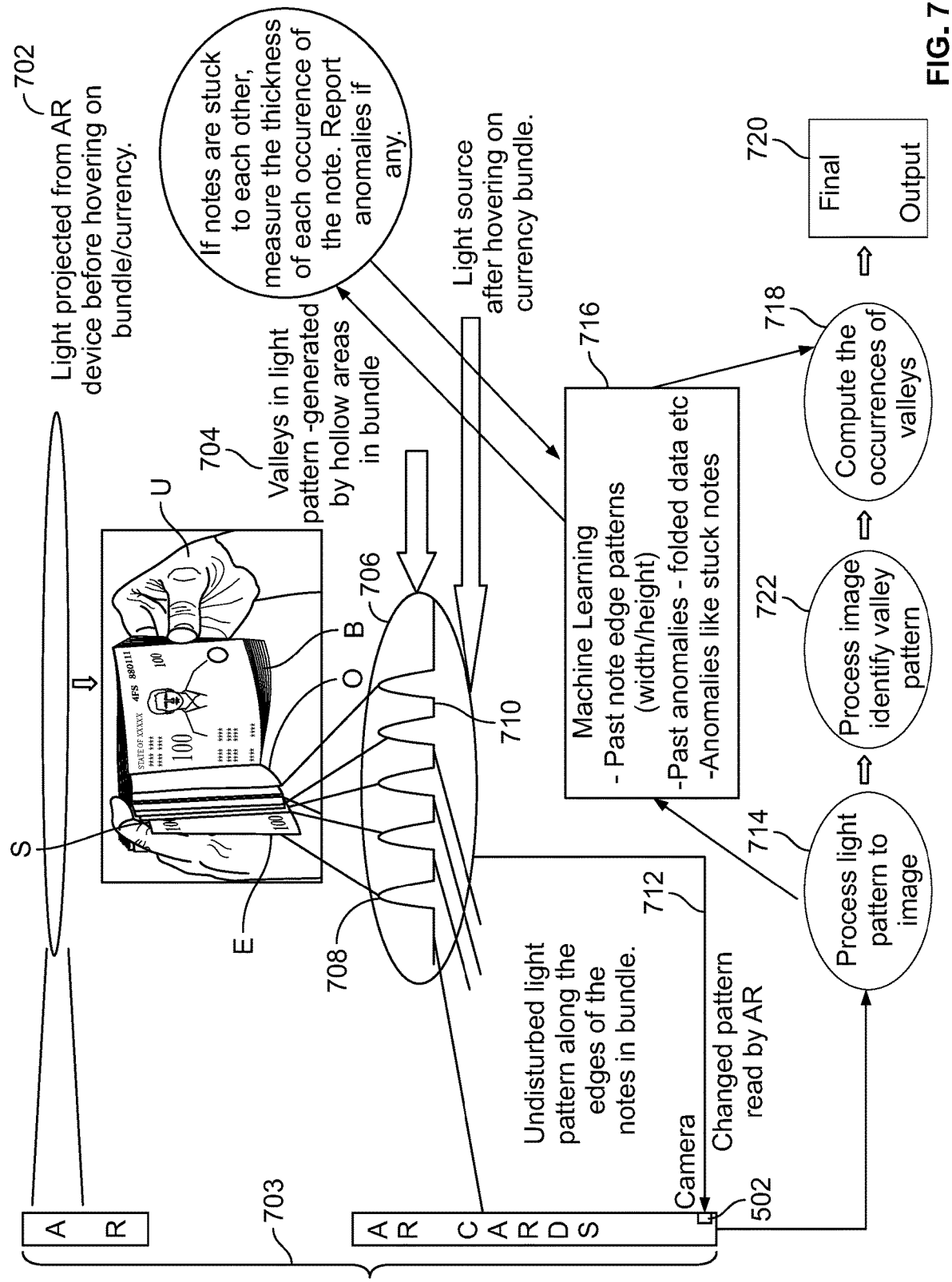
FIG. 7 shows illustrative process steps, along with illustrative apparatus, in accordance with principles of the invention.

FIG. 7 shows illustrative process 700 for using card 302 to count objects. At step 702, augmented reality ("AR") module 703 may control the light to emit light from card 302. At step 704, user U may flick objects, such as object O, of bundle B in the light. The flicking of the objects may produce a reflected light intensity pattern such as pattern 706. Pattern 706 may include intensity peaks such as intensity peak 708. Intensity peaks such as 708 may correspond to edges such as edge E of an objection in bundle B. Pattern 706 may include valleys such as valley 710. Valleys such as valley 710 may correspond to inter-object spaces such as space S. At step 712, camera 502 may capture pattern 706. At step 714, AR module 703 may process pattern 706 into an image. AR module 703 may provide natural-feature detection. AR module 703 may identify edges such as edge E as a lineation in a frame of video. The lineation may correspond to a peak such as 708. AR module 703 may grab numerous frames of edge E as edge E moves across a field of view of camera 502. AR module 703 may track motion of edge E across the field of view.

After step 714, process 700 may continue at step 716. At step 716, information card 302 may communicate with a machine learning ("ML") system that may help information card 302 identify features of bundle B, such as edge E or space S. The ML system may be remote from card 302. The ML system may be onboard card 302. The ML system may be configured to validate a finding of edge E based on a previously processed edge having a known characteristic. The characteristic may be an edge width. The characteristic may be an edge height. The ML system may be configured to validate a finding of an anomaly in the flicking of bundle B. The anomaly may be based on a folded object. The anomaly may be based on an adhesion between adjacent objects.

Process 700 may continue at step 718. At step 718, information card 302 may use pattern 706 to compute a sum of edges such as E. If information card 302 received feedback from the ML system, the sum may be revised based on the feedback. If information card 302 is unable to compute the sum, information card 302 may instruct user U to flick bundle B again.

At step 720, information card 302 may display the sum as a final output.

After step 714, process 700 may continue at step 722. At step 722, information card 302 may identify peaks and valleys in pattern 706 without interaction with the ML system of step 716. Process 700 may continue at step 718.

Figure 8:
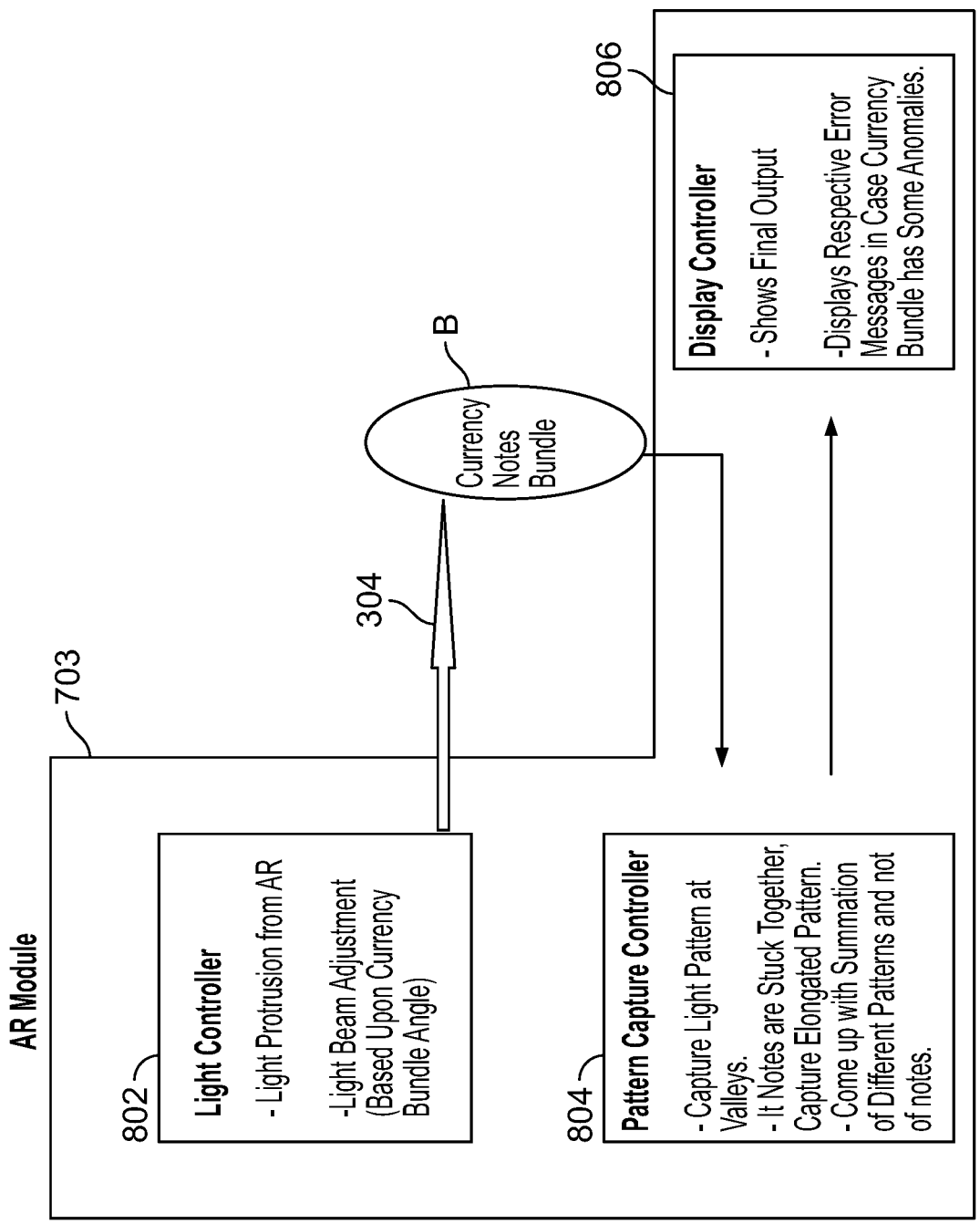
FIG. 8 shows illustrative apparatus in accordance with principles of the invention.

FIG. 8 shows illustrative AR module 703 interacting with bundle B (shown in FIG. 3). AR module 703 may include light controller 802. AR module 703 may include pattern capture controller 804. AR module 703 may include display controller 806. One or more elements of AR module 703 may be onboard information card 302. One or more elements of AR module 703 may be remote from information card 302.

Light controller 802 may cause a light in information card 302 to project light 304 from information card 302. Light 304 may include a light beam. Light controller 802 may adjust an angle of the light beam with respect to information card 302. The angle may be adjusted to conform to a position of bundle B with respect to information card 302. The angle may be adjusted to conform to angle of an edge such as edge E to information card 302.

Bundle B may reflect light back to pattern capture controller 804.

Pattern capture controller 804 may capture a light pattern such as 706 (shown in FIG. 7). Pattern capture controller 804 may capture a second light pattern based on detection of two objects stuck together. Pattern capture controller 804 may capture the second light pattern using a higher frequency of frame grabbing. Pattern capture controller 804 may discriminate between a single-object peak and a multi-object peak, such as when two objects are stuck together, using the higher frequency frame grabbing. Pattern capture controller 804 may determine a total count of features in a pattern or a second pattern. The features may be lineaments. Each of the lineaments may correspond to a single object in bundle B.

Display controller 806 may cause display 404 (shown in FIG. 4) to display a final output. The final output may be the total count. The final output may include a number of objects in bundle B. Display controller 806 may cause display 404 to display one or more error messages. An error message may correspond to an anomaly in bundle B.

Figure 9:
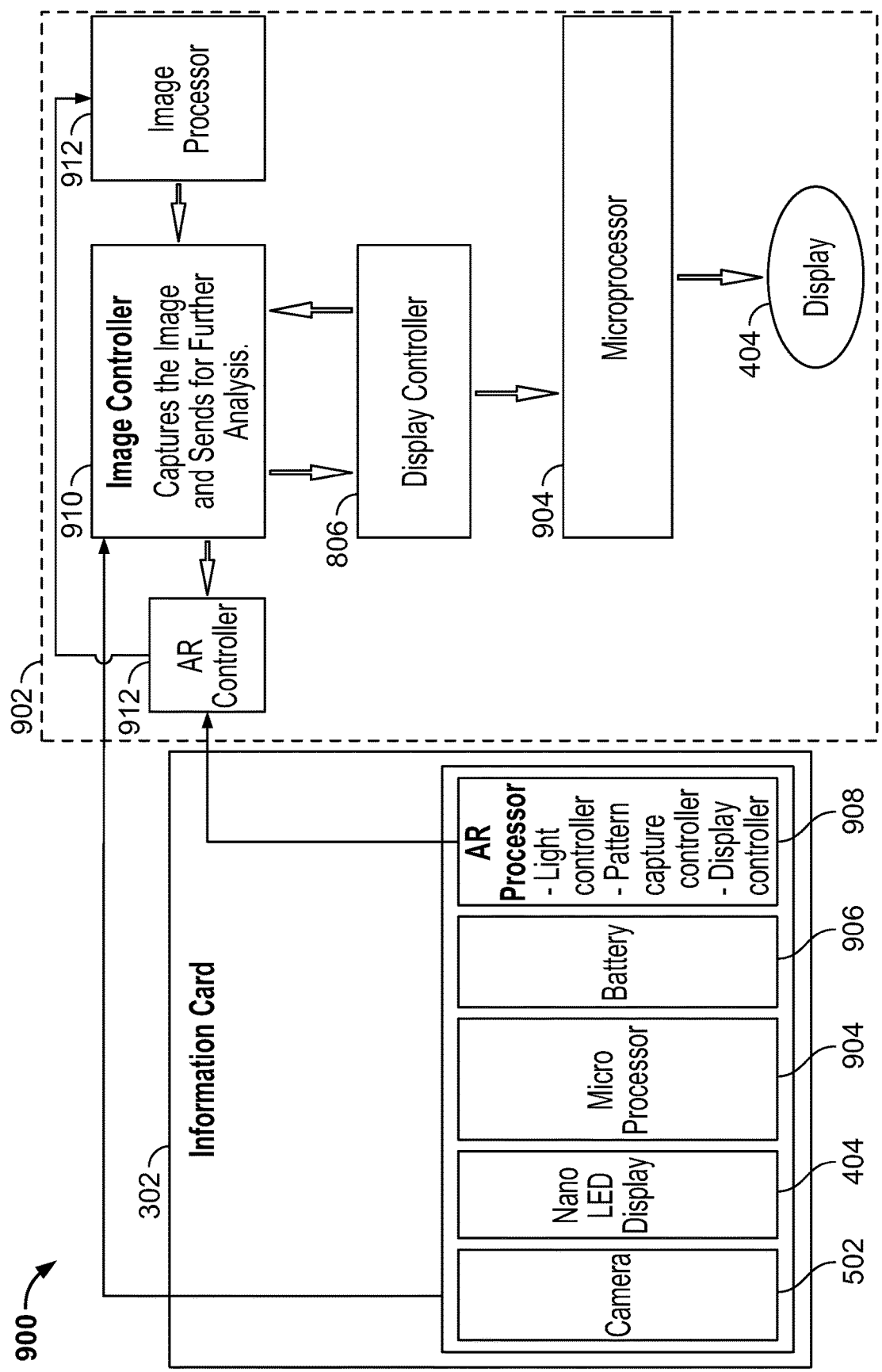
FIG. 9 shows illustrative apparatus, along with illustrative process steps, in accordance with principles of the invention.

FIG. 9 shows illustrative operational schematic 900. Schematic 900 includes information card 302. Schematic 900 shows illustrative operational flow 902. Information card 302 may include camera 502 (shown in FIG. 5). Information card 302 may include display 404. Information card 302 may include microprocessor 904. Circuitry 402 may include microprocessor 904. Information card 302 may include battery 906. Battery 906 may provide power to electrical and optical elements of information card 302. Information card 302 may include AR processor 908. AR processor 908 may include light controller 802. Information card 302 may include pattern capture controller 804. Information card 302 may include display controller 806.

Operational flow 902 shows that image controller 910 causes camera 502 to capture an image of the bundle. Image controller 910 may provide the image to AR controller 912. AR controller 912 may perform natural feature identification. Pattern capture controller may use the natural features to identify the light pattern. Pattern capture controller 804 may provide feedback to image processor 912. Image processor 912 may manipulate the image to enhance the natural feature identification.

Image controller 910 may transmit the image to the remote platform.

Image controller 910 may interact with display controller 806 to display images, via microprocessor 904, on display 404. The images may include images from camera 502. The images may include images derived by image processor 912. The images may include images having overlays showing natural features identified by AR processor 908.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for counting objects have been provided. Persons skilled in the art will appreciate that the present invention may be practiced by other than the described embodiments, which are presented for purposes of illustration rather than of limitation. The present invention is limited only by the claims that follow.

What is claimed is:

1. Apparatus for counting objects, the apparatus including:
   a microprocessor;
   in electronic communication with the microprocessor:
      a memory cell;
      a light source circuit;
      a camera circuit; and
      a nano light-emitting diode display circuit;
   stored in the memory cell:
      image-processing instructions; and
      light-source control instructions;
   wherein:
      the memory cell;
      the light source circuit;
      the camera circuit; and
      the nano light-emitting diode display circuit are embedded in an information card;

wherein the image processing instructions are configured to cause the microprocessor to detect lineations corresponding to an object bundle.

2. The apparatus of claim 1 the instructions are configured to cause the microprocessor to count manually flicked objects.

3. The apparatus of claim 2 wherein the image processing instructions are configured to detect the lineations using ambient light.

4. The apparatus of claim 2 wherein the microprocessor is configured to cause the light source circuit to emit a beam of light toward the bundle.

5. The apparatus of claim 4 wherein the image processing instructions are configured to store a frame grab from the camera in the memory.

6. The apparatus of claim 4 wherein:
the nano light-emitting diode display circuit includes a display; and
the microprocessor is configured to display a frame grab from the camera on the display.

7. The apparatus of claim 4 wherein the image processing instructions are configured to identify a light intensity peak in light reflected from an edge of a manually flicked object.

8. The apparatus of claim 7 wherein the image processing instructions are configured to identify a low light region contiguous with the light intensity peak.

9. The apparatus of claim 7 wherein the light intensity peak is one of a sequence of light intensity peaks, each peak corresponding to an object edge in the bundle.

10. The apparatus of claim 7 wherein:
the peak is of several peaks; and
the microprocessor is configured to determine a number of the peaks.

11. The apparatus of claim 10 wherein:
the image processing instructions are configured to identify:
a leading low-light region; and
a trailing low-light region;
the leading low-light region identifies a first object edge;
the trailing low-light region identifies a last object edge; and
the number is a number of peaks between the leading low-light region and the trailing low-light region.

12. The apparatus of claim 7 wherein the image processing instructions are configured to formulate for the peak a lineament that tracks motion of the corresponding object edge from a first frame grab to a second frame grab.

13. The apparatus of claim 12 wherein:
the lineament is one of a sequence of lineaments, each lineament corresponding to a different object in the bundle; and
the microprocessor is configured to determine a number of lineaments crossing a reference point in a field of view of the camera.

14. The apparatus of claim 12 wherein the image processing instructions are configured to render a time series of reflected light intensity at the reference point.

15. The apparatus of claim 14 wherein the image processing instructions are configured to render the time series based on the lineaments corresponding to the objects.

16. The apparatus of claim 14 wherein the image processing instructions are configured to detect an anomaly in the time series.

17. The apparatus of claim 16 wherein the anomaly is an over-broad peak.

18. The apparatus of claim 16 wherein the anomaly is an over-broad valley between consecutive peaks.

19. The apparatus of claim 16 wherein:
the nano light-emitting diode display circuit includes a display; and
the microprocessor is configured to display on the display an error code corresponding to the anomaly.

20. The apparatus of claim 16 wherein:
the image processing instructions are configured to generate a compressed data sequence corresponding to the time series; and
the information card is configured to transmit the compressed data sequence to a remote analysis engine.

21. The apparatus of claim 16 wherein the information card is configured to receive a filter kernel from a remote analysis the image processing instructions are configured to instruct the microprocessor to apply the kernel to the time series to detect the anomaly.

* * * * *